United States Patent [19]

Literati et al.

[11] Patent Number: 5,596,727

[45] Date of Patent: Jan. 21, 1997

[54] ARRANGEMENT FOR EXPANDING THE DEVICE CAPACITY OF A BUS

[75] Inventors: Alan J. Literati, Westminster; John M. Nichols; David M. Sueper, both of Broomfield; Richard A. Windhausen, Boulder, all of Colo.

[73] Assignee: Lucent Technologies Inc., Murray Hill, N.J.

[21] Appl. No.: 70,571

[22] Filed: Jun. 2, 1993

[51] Int. Cl.[6] .................................................. G06F 13/00
[52] U.S. Cl. ............................................................ 395/281
[58] Field of Search ..................................... 395/425, 325, 395/281

[56] References Cited

U.S. PATENT DOCUMENTS

| | | | |
|---|---|---|---|
| 4,464,658 | 8/1984 | Thelen | 340/825.5 |
| 4,494,193 | 1/1985 | Brahm et al. | 364/200 |
| 4,975,838 | 12/1990 | Mizuno et al. | 364/200 |
| 5,073,854 | 12/1991 | Martin et al. | 395/425 |
| 5,077,736 | 12/1991 | Dunphy, Jr. et al. | 371/10.1 |
| 5,081,578 | 1/1992 | Davis | 395/325 |
| 5,134,619 | 7/1992 | Henson et al. | 371/40.1 |
| 5,148,433 | 9/1992 | Johnson et al. | 371/11.3 |
| 5,175,822 | 12/1992 | Dixon et al. | 395/275 |
| 5,191,656 | 3/1993 | Forde, III et al. | 395/325 |
| 5,239,632 | 8/1993 | Larner | 395/325 |
| 5,274,783 | 12/1993 | House et al. | 395/281 |
| 5,303,244 | 4/1994 | Watson | 395/425 |
| 5,333,277 | 7/1994 | Soark | 395/325 |
| 5,450,552 | 9/1995 | Michino | 395/281 |
| 5,467,456 | 11/1995 | Moxley et al. | 395/281 |

FOREIGN PATENT DOCUMENTS

| | | | |
|---|---|---|---|
| 0461631 | 12/1991 | European Pat. Off. | G06F 12/06 |
| 4177552 | 6/1992 | Japan | G06F 13/14 |
| 2258932 | 2/1993 | United Kingdom | G06F 13/20 |

OTHER PUBLICATIONS

*Control to Enable One of Duplicate Circuits*, IBM Technical Disclosure Bulletin, vol. 21, No. 11, Apr. 1979, New York, US, pp. 4413–4414.

*Movable Bus Arbiter and Shared Bus Address*, IBM Technical Disclosure Bulletin, vol. 32, No. 88, Jan. 1990, New York, US, pp. 177–179.

P. D. Nalle et al. (eds.) *Microcomputer–Based Design*, McGraw–Hill, Inc. (1977), pp. 104–119.

*Primary Examiner*—Jack B. Harvey
*Assistant Examiner*—David A. Wiley
*Attorney, Agent, or Firm*—David Volejnicek

[57] ABSTRACT

An arrangement (FIG. 1) that allows banks (15, 25) of up to eight duplicated active devices (30–37, 40–47) to be connected to a SCSI bus (14) and to share SCSI device IDs, and also allows multiple hosts (10, 20) to share the SCSI bus and the connected active devices. Tri-state buffers (200) act as gates (13, 23, 38, 48) to interface host adapters (12, 24) of a plurality of hosts, and active devices of a plurality of device banks, to the SCSI bus. The gate of only one host adapter and the gates of only one bank of devices are enabled at any one time. Only the devices of the enabled bank can receive and respond to addresses from the SCSI bus, while the devices of the other banks are prevented from receiving and responding to addresses from the SCSI bus. Each host has a tri-state buffer acting as bank selector (16, 26) for selecting one of the device banks, by enabling the gates of the devices of the selected bank through a bank select bus (50). Only one host's bank selector is enabled at any one time.

15 Claims, 2 Drawing Sheets

5,596,727

ARRANGEMENT FOR EXPANDING THE DEVICE CAPACITY OF A BUS

TECHNICAL FIELD

This invention is directed generally to communications buses, and is directed specifically to the SCSI peripheral bus.

BACKGROUND OF THE INVENTION

The Small Computer System Interface (SCSI) input/output (I/O) bus is widely-used to connect peripheral devices, such as input and output interface devices and mass storage devices (e.g., disks and tapes), to small and medium-size computers, including to workstations and personal computers (PCs). As the complexity of applications that these computers support increases along with their power, there is arising a need to connect these computers to ever-more peripheral devices. Furthermore, as these computers come to support more mission-critical applications, the need for highly-reliable configurations (e.g., duplicated or redundant configurations) is becoming pronounced.

Unfortunately, the SCSI bus is not well suited to meet these needs. The standard SCSI bus has an addressing limit of eight device identifiers (IDs) and hence is limited to having only eight peripheral devices connected thereto. This number is reduced to only four distinct duplicated devices in a fault-tolerant application that relies on active-device redundancy. Furthermore, the SCSI bus standard requires each device ID to be unique.

SUMMARY OF THE INVENTION

This invention is directed to solving these and other problems and disadvantages of the prior art. Illustratively according to the invention, there is provided a bank-switching scheme that allows banks of duplicate devices on the SCSI bus to share SCSI device IDs. Control circuitry selects and communicatively connects to the bus only one of the banks of devices, and—if a plurality of host (i.e., bus master) devices are present—only one of the hosts at any one time, while keeping the other banks and hosts communicatively disconnected from the bus.

Generally according to the invention, in an apparatus that comprises a communications medium, such as a SCSI bus, a first active (e.g., enabled) addressable device connected to the medium, and a second active addressable device connected to the medium, wherein both active devices have the same address on the medium, there is included a selection arrangement coupled to the two devices, for enabling only one of the active devices at any one time to receive their common address on the medium. The others of the active devices are prevented from receiving their common address on the medium at the one time. Preferably, the selection arrangement comprises a plurality of means each connecting a corresponding device to the medium, and each for selectively either (a) communicatively coupling the corresponding active device to the medium or (b) communicatively uncoupling the corresponding active device from the medium, at any one time.

Advantageously, the arrangement allows active devices to share addresses on the medium, yet allows for selection of only one of the active devices that are sharing an address to be reached via, and respond to, that address at any one time. Hence, more active devices than there are unique device addresses may be connected to the medium. Thus, for example, more than eight active devices may be connected to a SCSI bus. The arrangement also preferably and advantageously communicatively uncouples all but one of the active devices that share an address from the medium in such a manner that the increase in the number of active devices that can be connected to the medium does not adversely affect the electrical characteristics of the medium. Hence, the arrangement facilitates either an increase in the number of distinct active devices, or a duplication of active devices without a corresponding decrease in the number of distinct active devices, that can be connected to the medium. Yet it does so without violating the SCSI standard.

Further preferably, the apparatus includes a plurality of hosts, each for communicating with the devices on the medium, and a selective coupling arrangement that connects the plurality of hosts to the medium but communicatively couples only one of the plurality of hosts to the medium at any one time. This configuration permits the medium to be used in a fault-tolerant apparatus, wherein the devices and the host are both replicated for reliability. For example, the invention supports use of the SCSI bus in an on-line/off-line host-processor configuration, again without violating the SCSI standard.

These and other advantages and features of the invention will become more apparent from the following description of an illustrative embodiment of the invention taken together with the drawing.

DETAILED DESCRIPTION

Figure 1:
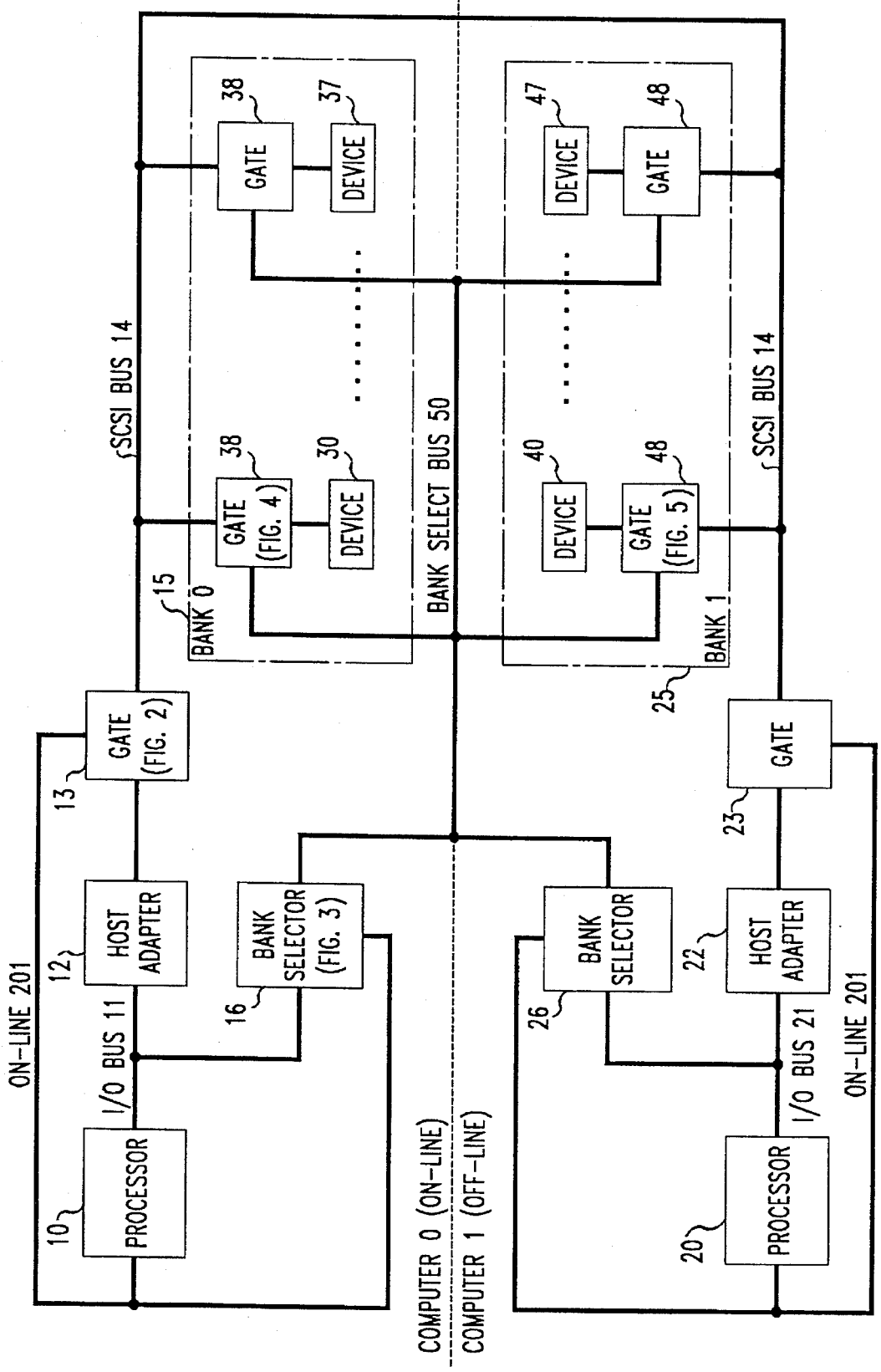
FIG. 1 is a block diagram of an illustrative computer system that includes an illustrative embodiment of the invention.

FIG. 1 shows an illustrative fault-tolerant SCSI-based computer system. The shown computer system comprises a pair of computers, computer 0 and computer 1, that mirror each other and operate in conventional active-standby redundancy mode. Illustratively, computer 0 is presently designated as the on-line computer and computer 1 is presently designated as the off-line, or standby, computer.

Each computer 0, 1 includes a conventional processor 10, 20 such as a workstation or a PC, connected by means of an I/O bus 11, 21 and a host adapter 12, 22 to a SCSI bus 14. SCSI bus 14 is connected to a plurality of peripheral devices 30–37, 40–47. These devices are assumed to include the conventional interface circuitry for connecting to a SCSI bus. Devices 30–37 illustratively duplicate devices 40–47 both in type and in data content. All devices 30–37, 40–47 are active, e.g., enabled, except during special circumstances such as device failure.

According to the invention, devices 30–37 form one bank 15 of devices, designated as bank 0, while devices 40–47 form another bank 25 of devices, designated as bank 1, and only one of the two banks 15, 25 of devices is addressable, and hence accessible, via SCSI bus 14 at any one time. Which bank 15, 25 is presently accessible is controlled by the on-line one of the processors 10, 20 by means of a bank select bus 50. Each device 30–37, 40–47 of a bank 15, 25 is coupled to SCSI bus 14 by its own gate 38, 48, and bus 50 controls all gates 38, 48 of a particular bank 15, 25 in tandem so as to communicatively couple or uncouple that bank's included devices 30–37, 40–47 to or from SCSI bus 14 simultaneously. A bank-selection operation performed across bus 50 must precede the SCSI bus operation (e.g., device access) of interest.

Each processor 10, 20 has an associated bank selector 16, 26 that interfaces that processor's I/O bus 11, 21 to bank select bus 50. Only the on-line processor's bank selector is active at any one time, thereby permitting only the presently-on-line processor to control bank selection. Similarly, only the on-line one of the processors 10, 20 has access to SCSI bus 14 at any one time. Each processor's corresponding host adapter 12, 22 is interfaced to SCSI bus 14 by a gate 13, 23. Only the on-line processor's host adapter is functionally connected by its gate to SCSI bus 14 at any one time, thereby permitting only the presently-on-line processor to access the devices on SCSI bus 14.

Figure 2:
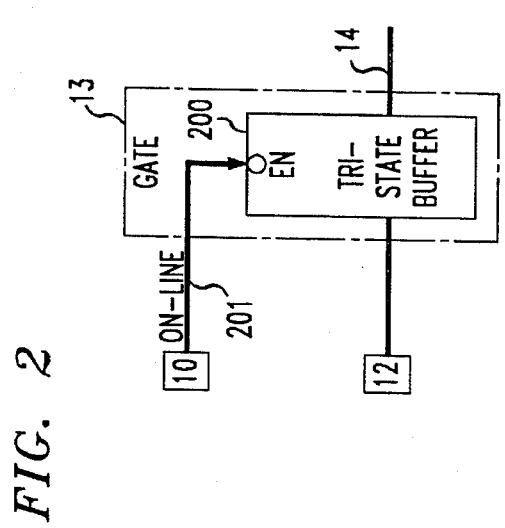
FIG. 2 is a block diagram of a host adapter gate of the system of FIG. 1.

FIG. 2 shows an illustrative structure of host adapter gate 13, which is representative of all host adapter gates in the system of FIG. 1. Gate 13 comprises a tri-state buffer 200 that is interposed between host adapter 12 and SCSI bus 14. Buffer 200 is a conventional device, such as the Texas Instruments tri-state device no. 244. Alternatively, a digitally-controlled analog switch may be used. An enable (EN) input of buffer 200 is connected to an ACTIVE lead 201 from processor 10. While processor 10 is the on-line processor, it asserts lead 201 and thereby enables buffer 200. Enabled buffer 200 communicatively connects host adapter 12 with SCSI bus 14. While processor 10 is not the on-line processor, it deasserts lead 201 and thereby disables buffer 200. Disabled buffer 200 is in the tri-state mode, and thereby communicatively disconnects host adapter 12 from SCSI bus 14.

Figure 3:
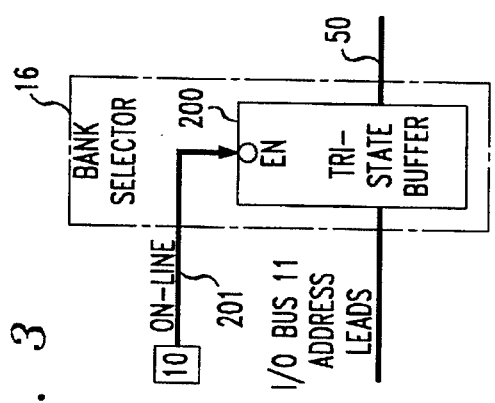
FIG. 3 is a block diagram of a bank selector of the system of FIG. 1.

FIG. 3 shows an illustrative structure of bank selector 16, which is representative of all bank selectors in the system of FIG. 1. Bank selector 16 structurally duplicates host adapter gate 13. Tri-state buffer 200 of bank selector 16 couples one or more address leads of I/O bus 11 to the leads of bank select bus 50. In the configuration of FIG. 1 where there are only two banks of devices, bank select bus 50 is illustratively only a single lead, and hence bank selector 16 couples only one —illustratively the most significant—address lead of I/O bus 11 to bus 50. While processor 10 is the on-line processor, bank selector 16 is enabled via ON-LINE lead 201 and passes through to bus 50 the address-bit value by means of which processor 10 selects one or the other of banks 15 and 25. Illustratively, deassertion of bus 50 serves to select bank 15, while assertion of bus 50 serves to select bank 25. While processor 10 is not the on-line processor, bank selector 16 is disabled via ON-LINE lead 201. Disabled bank selector 16 is in the tri-state mode, and thereby communicatively disconnects I/O bus 11 from bus 50.

Figure 4:
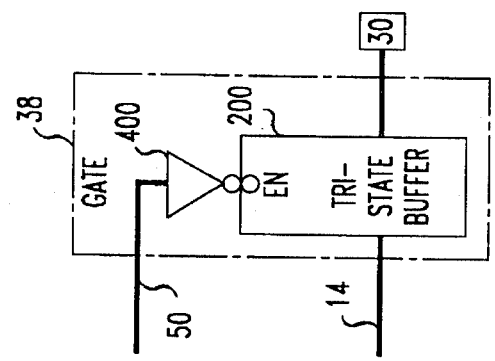
FIG. 4 is a block diagram of a device gate of device bank 0 of the system of FIG. 1.

FIG. 4 shows an illustrative structure of a device gate 38, which is representative of all device gates 38 in the system of FIG. 1. Device gate 38 structurally also duplicates host adapter gate 13. Tri-state buffer 200 of device gate 38 couples the connected device 30 to SCSI bus 14. Its enable input is connected to bank select bus 50 through an inverter 400. While bus 50 is deasserted, thereby signaling selection of device bank 15 by the on-line one of the processors 10, 20, the enable input of buffer 200 of gate 38 is asserted and buffer 200 is enabled thereby. Enabled buffer 200 communicatively connects device 30 to SCSI bus 14, thereby enabling device 30 to receive and respond to its address from SCSI bus 14. While bus 50 is asserted, thereby signaling selection of device bank 25, the enable input of buffer 200 of gate 38 is deasserted and buffer 200 is disabled thereby. Disabled buffer 200 is in the tri-state mode, and thereby communicatively disconnects device 30 from SCSI bus 14, preventing device 30 from receiving and responding to its address from SCSI bus 14.

Figure 5:
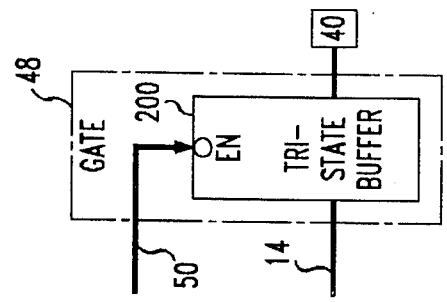
FIG. 5 is a block diagram of a device gate of device bank 1 of the system of FIG. 1.

FIG. 5 shows an illustrative structure of a device gate 48, which is representative of all device gates 48 in the system of FIG. 1. Device gate 48 duplicates device gate 38 but for the fact that bus 50 is connected directly to the enable input of buffer 200 of gate 48. As a consequence, gate 48 is enabled by bus 50 whenever gate 38 is disabled by bus 50, and vice versa. As a consequence, at any one time, only one bank 15, 25 of devices is communicatively connected to SCSI bus 14 and is accessible thereacross. Hence, even though a pair of active devices 30–37, 40–47 share the same SCSI bus device ID, only one device of that pair is able to respond on SCSI bus 14 to that device ID at any one time.

Of course, various changes and modifications to the illustrative embodiment described above will be apparent to those skilled in the art. For example, the illustrative computer system may be expanded to include more than just two hosts and/or device banks, or even entire computers. In such a configuration, each host will have its own bank selector, and may either share a host adapter with another host or have its own host adapter; each host adapter will have its own host adapter gate. If there are more than two device banks, the bank select bus will be a multi-lead bus, illustratively having a separate enable lead connected to each device bank, and each bus selector will additionally include conventional logic circuitry that converts bank-selection address signals received from its connected I/O bus into assertion of only one of the leads of the bank select bus. Or, the host need not operate in an on-line/off-line configuration, but rather may operate in a multi-processor configuration where all hosts are on-line simultaneously. In such an arrangement, an arbitration mechanism is provided to enable only one host to access the SCSI bus at any one time—only that one host's ON-LINE lead or a functional equivalent thereof will be asserted at any one time. Conversely, the invention may be used to advantage with only one host, simply to expand the number of devices supportable on the SCSI bus. Such changes and modifications can be made without departing from the spirit and the scope of the invention and without diminishing its attendant advantages. It is therefore intended that such changes and modifications be covered by the following claims.

We claim:

1. An apparatus comprising:

a SCSI bus;

a plurality of device banks connected to the SCSI bus for communicating on the SCSI bus, each device bank comprising a plurality of active devices, the active devices of one device bank having same SCSI addresses on the SCSI bus as the active devices of the other device banks; and selection means coupled to the plurality of device banks, for enabling the active devices of only one of the plurality of device banks at any one time to receive the SCSI addresses on the SCSI bus while preventing the active devices of the others of the plurality of device banks at the one time from receiving the SCSI addresses on the SCSI bus.

2. The apparatus of claim 1 wherein
the selection means comprise:
- a plurality of first gate means, a different one selectively communicatively connecting or disconnecting each active device of the plurality of device banks to or from the SCSI bus; and
- bank select means connected to the plurality of first gate means, responsive to selection of one of the device banks by a SCSI host, for causing the first gate means to communicatively connect the active devices of only the selected one of the device banks to the SCSI bus at any one time.

3. The apparatus of claim 1 further comprising:
- a plurality of SCSI hosts, each for communicating with active devices on the SCSI bus; and
- selective coupling means connecting the plurality of SCSI hosts to the SCSI bus, for communicatively coupling only one of the plurality of SCSI hosts to the SCSI bus at any one time.

4. An apparatus comprising:
- a SCSI bus;
- a plurality of device banks, each comprising a plurality of active devices, the active devices of one device bank having same SCSI addresses on the SCSI bus as the active devices of the other device banks;
- a plurality of first gate means, each one communicatively connecting, when enabled, a different corresponding active device of the plurality of device banks to the SCSI bus, and each one communicatively disconnecting, when disabled, the corresponding active device from the SCSI bus;
- a plurality of hosts, each having its own SCSI host adapter;
- a plurality of second gate means, each one communicatively connecting, when enabled, a different corresponding one of the SCSI host adapters to the SCSI bus, and each one communicatively disconnecting, when disabled, the corresponding SCSI host adapter from the SCSI bus;
- a bank select bus connected to the plurality of first gate means for selectively enabling the first gate means of the active devices of only one of the device banks at any one time while at the one time disabling the first gate means of the active devices of the others of the device banks;
- a plurality of bank selectors connected to the bank select bus, each bank selector corresponding to a different one of the plurality of hosts, each responsive, when enabled, to selection by the corresponding host of a device bank for causing the bank select bus to enable the first gate means of the active devices of the selected device bank, and each non-responsive to the selection when not enabled; and
- enabling means coupled to the plurality of second gate means and to the plurality of bank selectors for enabling, at any one time, the second gate means and the bank selector corresponding to only a selected one of the plurality of hosts.

5. The apparatus of claim 4 wherein
each first gate means and each second gate means comprises a tri-state buffer.

6. The apparatus of claim 5 wherein
each bank selector comprises a tri-state buffer.

7. The apparatus of claim 4 wherein
the plurality of hosts operate in an on-line/off-line configuration; and the enabling means enable at any one time the second gate means and the bank selector corresponding to only the on-line one of the hosts.

8. An apparatus comprising:
- a communications bus;
- a plurality of device banks each comprising a plurality of active addressable devices connected to the communications bus for communicating on the communications bus, the active addressable devices of one device bank being addressed by same addresses on the communications bus as the active addressable devices of the other device banks; and
- selection means coupled to the plurality of device banks, for enabling the active addressable devices of only one of the plurality of device banks at any one time to receive, and thus be addressed by, addresses on the communications bus while preventing the active addressable devices of the others of the plurality of device banks at the one time from receiving, and thus being addressed by, addresses on the communications bus.

9. The apparatus of claim 8 wherein
the selection means comprise:
- a plurality of first gate means, a different one selectively communicatively connecting or disconnecting each active addressable device of the plurality of device banks to or from the communications bus; and
- bank select means connected to the plurality of first gate means, responsive to selection of one of the device banks by a communications-bus host, for causing the first gate means to communicatively connect the active addressable devices of only the selected one of the device banks to the communications bus at any one time.

10. The apparatus of claim 9 wherein:
the plurality of first gate means are passive gate devices.

11. The apparatus of claim 9 wherein:
the plurality of first gate means have no involvement in information flow between the communications bus and the active addressable devices of the plurality of device banks other than connecting and disconnecting the active addressable devices and the communications bus.

12. The apparatus of claim 8 wherein:
the selection means are for enabling the active addressable devices of only the one device bank at said one time to receive all information carried by the communications bus at said one time while preventing the active addressable devices of the other device banks at said one time from receiving any information carried by the communications bus at said one time.

13. The apparatus of claim 8 wherein:
the selection means have no involvement in information flow between the communications bus and the active addressable devices of the plurality of device banks other than enabling and preventing the information flow between the active addressable devices and the communications bus.

14. The apparatus of claim 8 wherein
the selection means pass through without changing the addresses from the communications bus to the active addressable devices of the one of the device banks, and block the addresses from the communications bus from reaching the active addressable devices of the others of the device banks.

15. A method of operating an apparatus comprising a communications bus and a plurality of device banks each comprising a plurality of active addressable devices connected to the communications bus for communicating on the communications bus, the active addressable devices of one device bank being addressed by the same addresses on the communications bus as the active addressable devices of the other device banks, comprising the steps of:

in response to receipt of a device bank selection signal, enabling the active addressable devices of only a selected one of the plurality of device banks at any one time to receive, and thus be addressed by, addresses on the communications bus; and in response to said receipt, preventing the active addressable devices of the others of the plurality of device banks at the one time from receiving, and thus being addressed by, addresses on the communications bus.

* * * * *